United States Patent
Yalniz et al.

(10) Patent No.: US 10,026,229 B1
(45) Date of Patent: Jul. 17, 2018

(54) AUXILIARY DEVICE AS AUGMENTED REALITY PLATFORM

(71) Applicant: A9.com, Inc., Palo Alto, CA (US)

(72) Inventors: Ismet Zeki Yalniz, Mountain View, CA (US); Rahul Bhotika, Redmond, VA (US); Song Cao, Seattle, WA (US); Michael Patrick Cutter, Mountain View, CA (US); Colin Jon Taylor, Orinda, CA (US); Mark Scott Waldo, El Cerrito, CA (US); Chun-Kai Wang, Mountain View, CA (US); Daniya Zamalieva, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 32 days.

(21) Appl. No.: 15/019,257

(22) Filed: Feb. 9, 2016

(51) Int. Cl.
*G09G 5/00* (2006.01)
*G06T 19/00* (2011.01)
*G06T 7/00* (2017.01)
*G06K 9/00* (2006.01)

(52) U.S. Cl.
CPC ........ *G06T 19/006* (2013.01); *G06K 9/00671* (2013.01); *G06T 7/0044* (2013.01); *G06T 2207/30204* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,358,255 | B2 * | 1/2013 | Yoshihama | G09G 3/2927 345/60 |
| 8,731,301 | B1 * | 5/2014 | Bushman | G06K 9/00671 235/375 |
| 8,731,332 | B2 * | 5/2014 | Osako | G06T 7/74 382/287 |
| 2008/0111886 | A1 * | 5/2008 | Bai | G09G 3/20 348/173 |
| 2008/0174522 | A1 * | 7/2008 | Cho | G09G 3/2927 345/60 |
| 2010/0075712 | A1 * | 3/2010 | Sethuraman | H04M 1/6041 455/556.1 |
| 2011/0093339 | A1 * | 4/2011 | Morton | G06Q 30/02 705/14.58 |
| 2011/0148924 | A1 * | 6/2011 | Tapley | G06F 3/011 345/634 |

(Continued)

*Primary Examiner* — M Good Johnson
(74) *Attorney, Agent, or Firm* — Hogan Lovells US LLP

(57) ABSTRACT

An auxiliary device can be used to display a fiducial that contains information useful in determining the physical size of the fiducial as displayed on the auxiliary device. A primary device can capture image data including a representation of the fiducial. The scale and orientation of the fiducial can be determined, such that a graphical overlay can be generated of an item of interest that corresponds to that scale and orientation. The overlay can then be displayed along with the captured image data, in order to provide an augmented reality experience wherein the image displayed on the primary device represents a scale-appropriate view of the item in a location of interest corresponding to the location of the auxiliary device. As the primary device is moved and the viewpoint of the camera changes, changes in relative scale and orientation to the fiducial are determined and the overlay is updated accordingly.

19 Claims, 10 Drawing Sheets

(56) References Cited

U.S. PATENT DOCUMENTS

| | | | |
|---|---|---|---|
| 2012/0271715 A1* | 10/2012 | Morton | G06Q 30/0257 |
| | | | 705/14.53 |
| 2012/0327117 A1* | 12/2012 | Weller | G06T 7/0042 |
| | | | 345/633 |
| 2013/0050499 A1* | 2/2013 | Siklossy | G06T 7/0042 |
| | | | 348/169 |
| 2013/0301879 A1* | 11/2013 | Polo | G06K 9/3241 |
| | | | 382/103 |
| 2014/0168264 A1* | 6/2014 | Harrison | G02B 27/0176 |
| | | | 345/633 |
| 2015/0309578 A1* | 10/2015 | McCoy | G06F 3/017 |
| | | | 715/863 |
| 2016/0247320 A1* | 8/2016 | Yuen | G06T 19/006 |
| 2017/0046876 A1* | 2/2017 | Bean | G06T 19/006 |

\* cited by examiner

AUXILIARY DEVICE AS AUGMENTED REALITY PLATFORM

BACKGROUND

Users are increasingly utilizing electronic devices to research, locate, and obtain various types of information. For example, users may utilize a search engine to locate information about various items, such as furniture or other items offered through an electronic marketplace. If a portable computing device is being used to capture a live view of a location in a user's house, for example, the device may be able to superimpose an image of an object of interest over the live view. This view may or may not be to scale, which limits the practical use of such a view. While technologies exist for three-dimensional mapping and dimension determination, these technologies are not available in many consumer devices and, even if available, require a significant amount of resources, which may be undesirable for portable devices with limited battery life.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to enabling a user to obtain a view of an object of interest in a physical space. In particular, various embodiments enable a fiducial to be displayed on an auxiliary device placed at a specific location. A fiducial as used herein refers to a distinct pattern or graphic that enables a monocular device, such as a camera of a mobile phone, to determine the pose and distance from the plane that contains the fiducial. A primary device can capture image data including a representation of the fiducial and objects near that location. The image data can be analyzed to locate the fiducial and extract information contained in the fiducial. This can include information about the auxiliary device that can be used to determine the physical size of the fiducial as displayed, from which the scale at the specific location as represented in the captured image data can be determined. The relative orientation of the fiducial to the primary device can also be determined. Based on the scale and orientation information, a graphical element for an item of interest can be selected, resized, and/or generated that corresponds to the orientation and scale for the location in the image. The graphical element can be displayed as an overlay with respect to the live view, enabling a view to be displayed that appears as if the item is located in the scene. The view can be updated as the primary device is moved, based on changes in the relative orientation of the fiducial to the primary device. Various other objects can be displayed for such an augmented reality experience, as may include virtual assistants, animated characters, and the like.

Various other functions and advantages are described and suggested below as may be provided in accordance with the various embodiments.

Figure 1A:
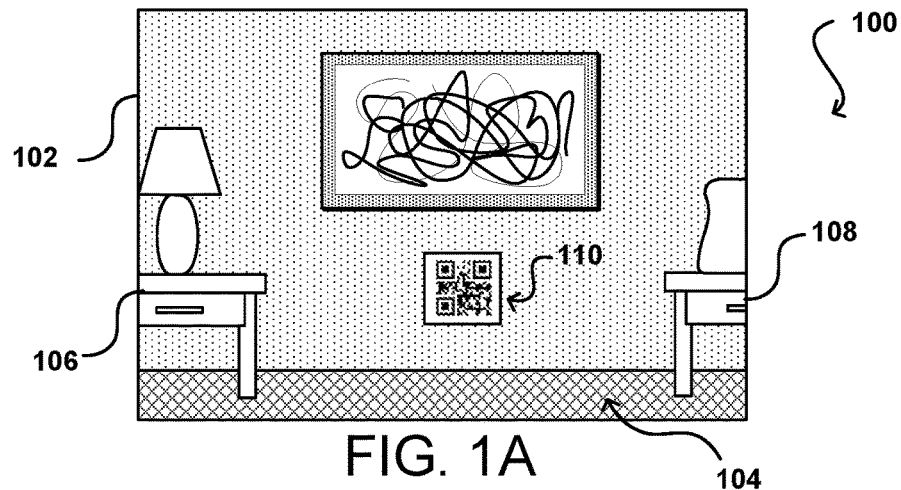
FIGS. 1A and 1B illustrate example views in which images of one or more objects can be displayed in accordance with various embodiments.

FIG. 1A illustrates an example image 100 that can be captured by a camera of a computing device, such as a smartphone, tablet, or smart watch, in accordance with various embodiments. This image 100 illustrates a view 102 of a room in the user's home where the user would like to place an item of furniture, such as a couch or sofa. Other items can be placed there as well, such as televisions, children's toys, and the like. The view includes representations of various objects 106, 108 in the room, such that the user can get some idea of how an item would actually look if placed in the room. As discussed later herein, if scale information is available for the image then any object representation placed in, or over, the image can be adjusted (i.e., through resizing, compression, and/or interpolation) to an appropriate size such that a scale of the object of interest in the image matches the scale of other objects represented in the image. The dimensions or scale of the object represented in the image can be obtained from metadata within the image, catalog data associated with the image, or from another appropriate source.

In one embodiment, a fiducial 110 can be positioned such that a representation of the fiducial will be contained in the image 100 captured of the view of the room. In this example, the fiducial is a paper, piece of cardboard, flat plastic sheet, or other such object that has an image, text, or other information printed or otherwise represented thereon. The information can have a known scale, such that the scale of the location in the image can be determined. For example, if the fiducial is known to be one foot across, and the space between the tables 106, 108 is five times as wide as the fiducial, then it can reasonably be estimated, within an acceptable margin of error in this example, that there is approximately five feet of space between the tables. This helps to determine the size of an object that can fit between the tables. Further, the scale of each pixel at that location can be determined as well. If there are 100 pixels across the representation of the fiducial in the image, then each pixel represents $1/100^{th}$ of an foot. If an item is selected that is two and one half feet across, then an overlay of that object should be resized such that the representation of the item should be 250 pixels across. Various approaches for resizing an image can be used as known in the art for such purposes.

Figure 1B:
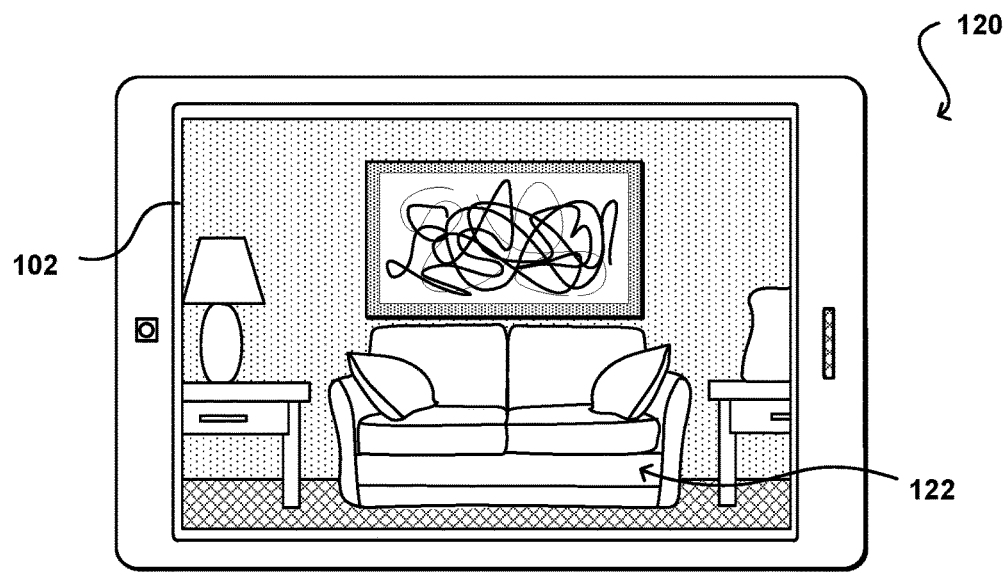

Once the representation of the fiducial is analyzed and the scale determined, a scale-appropriate overlay 122 can be rendered, as illustrated in the example image 120 of FIG. 1B. In this example, the overlay is initially positioned so as to be centered over the fiducial 110, although other options can be utilized as well. For example, if the floor can be recognized in the image then the overlay including the representation of the couch can be positioned so as to appear to be sitting on the floor of the room. In some embodiments the overlay image will be cropped to the edges of the item, with any padding being removed or set to transparent, among other such options. A user can adjust the position of the overlay in the view in at least some embodiments, such as by dragging a finger or cursor across the screen to cause the overlay to move in a corresponding direction. A user can also have the option to switch items, switch room views, view multiple item overlays, or cause the device to perform various other functions as discussed and suggested elsewhere herein.

While such an approach has many advantages, a potential disadvantage lies in the fact that users frequently will not utilize such a fixed fiducial. Users may not want to store a fiducial object for a period of time, and may not take the time or effort to print such a fiducial as needed in many situations. In other situations a user may not be in a location or have access to devices where obtaining a physical fiducial is practical.

Accordingly, approaches in accordance with various embodiments can utilize a second computing device, or other such display-capable object, to provide a fiducial in accordance with various embodiments. In at least some embodiments, a fiducial can be displayed using a conventional computing device, such as a smartphone, tablet, laptop, or smart watch, among other such options. An application can be installed on any of these devices, for example, which can enable an appropriate fiducial to be displayed. An advantage to such an approach is that any device with the application installed can potentially display a fiducial, regardless of an owner of the device. For example, a first device corresponding to a first owner wanting to obtain a view of an object in an area can ask a second owner of a second device to cause a fiducial to be displayed on the second device that can be imaged by the first device. As mentioned elsewhere herein, information can be encoded or included in the fiducial such that the devices also do not have to otherwise communicate in at least some embodiments.

Figure 2A:
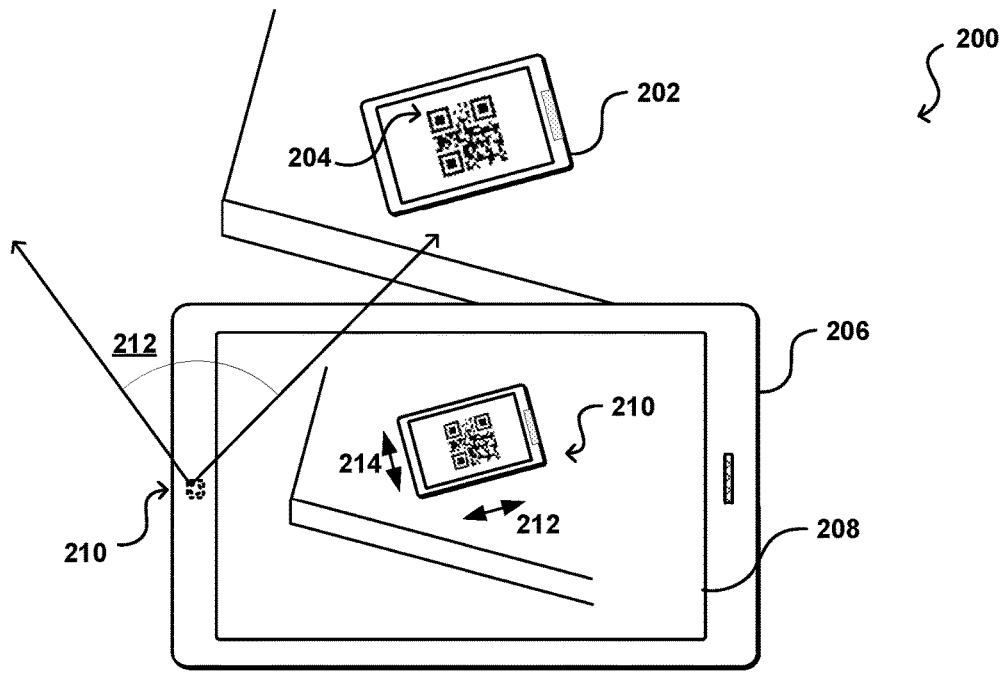
FIGS. 2A and 2B illustrate an example in which a fiducial displayed on a second device can be used to generate a scale-appropriate view of an object in accordance with various embodiments.

FIG. 2A illustrates a first example situation 200 in which a computing device 202 is displaying a fiducial 204 on a display screen of the device. As mentioned, in some embodiments this can involve opening, executing, or otherwise causing an application to obtain the appropriate information and cause the fiducial to be rendered on the display. While the fiducial in this example is a quick response (QR) code, the fiducial can be any appropriate fiducial as discussed and suggested elsewhere herein. The application can use information such as the model of the computing device, information about the screen, or other such information to select and/or render a fiducial with an appropriate scale, and that in at least some embodiments fills up a significant portion of the display screen. In some embodiments the fiducial is relatively simple, in order to enable a quick and easy recognition by a second computing device. The fiducial can also be designed in at least some embodiments to provide directionality, such that the relative orientation of the fiducial in the image can be relatively easily determined. In some embodiments the fiducial will allow for some complexity, however, in order to enable information to be encoded into the fiducial, as may provide model, scale, or other relevant information. In this example, the QR code can provide relative ease of detection and directionality, as well as the ability to encode relevant information using the code itself. In this example the fiducial is displayed with the device laid flat on a horizontal surface, such as a table, although other orientations can be utilized as well. In some embodiments an application or device can be configured to automatically display a fiducial when the device is stationary in such an orientation and not being held by a user, etc.

A second device 206 can be positioned such that the fiducial 204 is located within a field of view 212 of a camera 210 of the device, in this case on a side opposite a display screen 208 of the device, although other configurations can be utilized as well. While in some embodiments a single image, or set of images, can be captured for purposes of the overlay, in this example the image data captured is part of a video stream which is displayed on the display screen 208 of the second device. This enables the user to obtain a "live view" of the region contained within the field of view 212, although it should be understood that there will be some slight delay inherent to the video capture and display process.

Figure 2B:
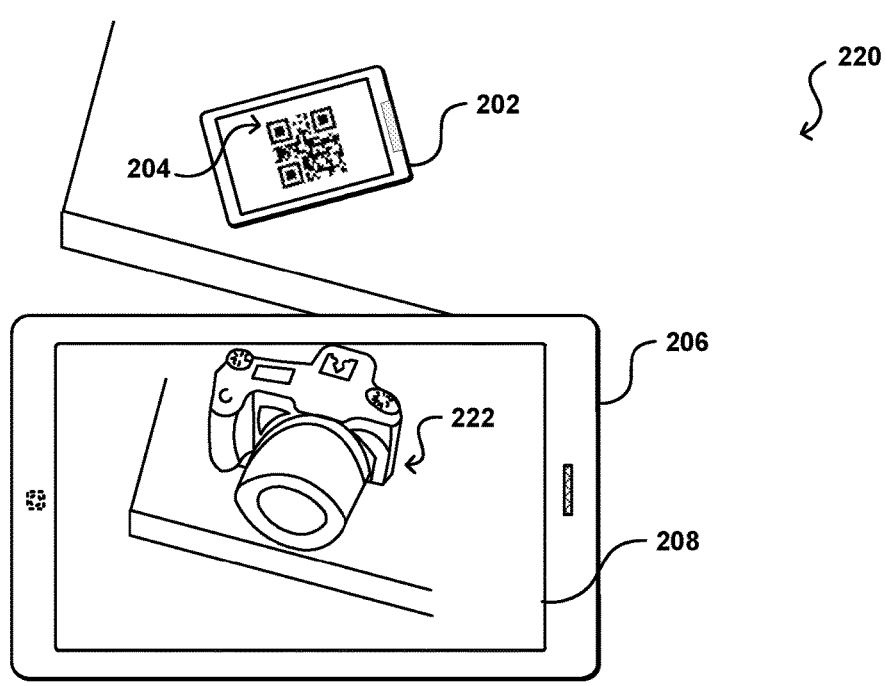

In this example, the image data captured or otherwise acquired using the camera 210 can be analyzed to locate or recognize the fiducial represented in the image data. The fiducial can then be analyzed, on the second device 206 or on a remote server as part of a cloud offering, for example, to determine a relative scale of the representation of the fiducial. This can include, for example, identifying the type of fiducial or information encoded into the fiducial in order to determine the size of the fiducial 204 as displayed on the display screen of the first device 202. That scale, once determined, can be used to adjust the size of an overlay to represent an item with a corresponding scale. In the example 220 of FIG. 2B, an overlay image 222 of a specific camera can be generated and displayed "over" the live view of the area on the second device 206, replacing portions of the scene that would otherwise be displayed by the device. The overlay can be rendered or resized such that the size of the item is appropriate for the location of the fiducial as represented in the image, and thus has an appropriate scale for that distance from the camera 210 and the size of the item. In this example, a view of the item can be selected and/or rendered that is appropriate for the location. In this example, an orientation of the surface can be determined and a view of the item rendered to appear to be sitting on that surface. In this example the surface is a table, and the item can be rendered with a scale-appropriate view that appears to be sitting on the table in the live view. In some instances a three-dimensional model of the item can exist, such that the two-dimensional view can be rendered from the appropriate viewpoint. In other embodiments a fixed set of images might exist for an item, such that the most appropriate image can be selected and then resized as appropriate for the determined scale, among other such options.

Figure 3A:
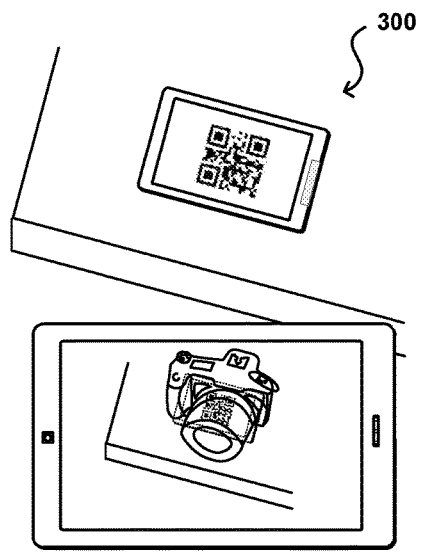
FIGS. 3A, 3B, 3C, and 3D illustrate views from different viewpoints that can be rendered in accordance with various embodiments.
Figure 3B:
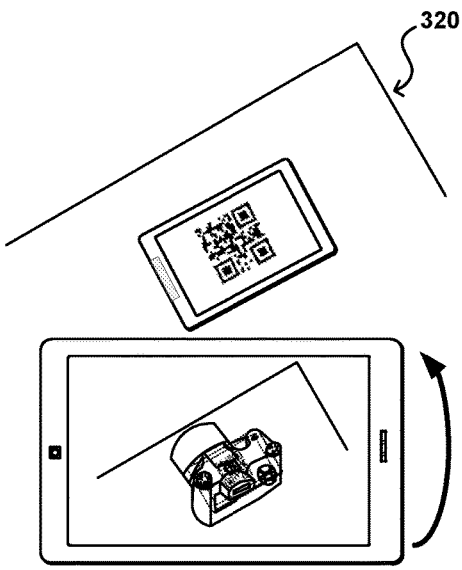
Figure 3C:
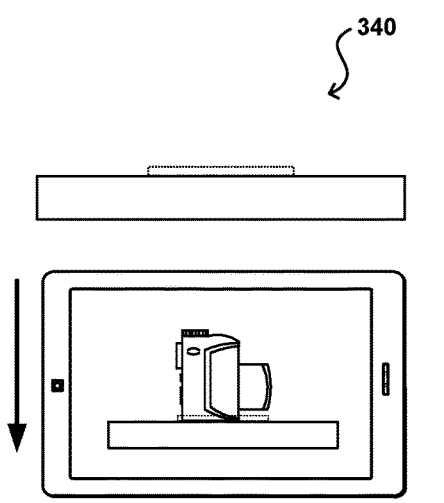
Figure 3D:
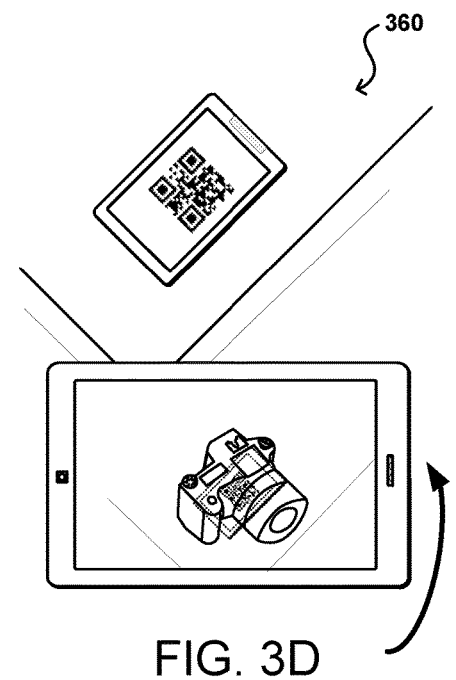

An advantage of using a live view is that the view rendered for the overlay can update with the view angle of the device camera. For example, FIGS. 3A through 3D illustrate views 300, 320, 340, 360 that can be rendered in accordance with various embodiments. As illustrated, for each of the views the computing device is in a different relative position with respect to the fiducial. Because the relative orientation can be determined by analyzing the representation of the fiducial in the respective image data, as well as the appropriate scale, a corresponding view of the item can be rendered from the same viewpoint and with a similar scale. As illustrated, between FIGS. 3A and 3B the device is moved around the item such that the user can view both the front and back of the item. In FIG. 3C, the computing device is moved such that a side view of the item is displayed. It should be noted that in some embodiments the fiducial is analyzed over time in order to adjust the rendering of the overlay based on a current or most recent analysis of the fiducial. In other embodiments the fiducial is analyzed initially, or in some cases periodically, to get a scale and orientation, then motion of the computing device is analyzed to determine how to update the rendered overlay or other such graphic. In FIG. 3C, the fiducial is not detectable in the captured live view due to the angle at which the image data is captured. Using a motion and/or orientation sensor, such as an accelerometer, magnetometer, electronic gyroscope, inertial sensor, and the like, however, enables the relative orientation to be updated by monitoring the motion of the computing device. Knowing the scale and the specific fiducial enables a calculation of distance to the fiducial, as well as direction obtained from the image data, such that a relative three dimensional position can be determined, and the relative position of this three-dimensional point to the computing device can be updated and/or determined by determining changes to the position and/or orientation of the computing device in space. The computing device can continue to be moved, as illustrated in the example view 360 of FIG. 3D, in order to enable the device to display any view desired by the user. Another advantage to such an approach is that the user can get some sense of the size and shape of the object, particularly with respect to other objects represented in the live view. The set of objects captured in a live view for a location can be referred to collectively as a "scene," and such functionality enables the user to determine how the item would look from different views in the scene. As mentioned, the user can also have the option to adjust the position of the overlay by moving the overlay or physically moving the fiducial, among other such options.

Figure 4A:
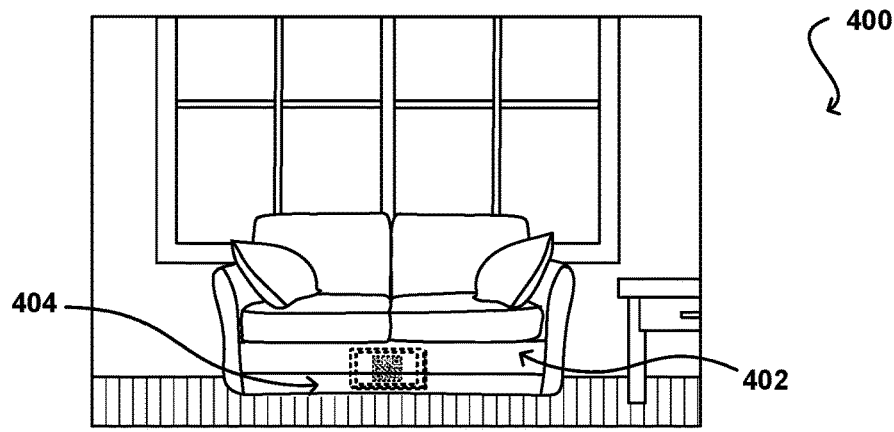
FIGS. 4A, 4B, and 4C illustrate views of a different object from different viewpoints that can be utilized in accordance with various embodiments.
Figure 4B:
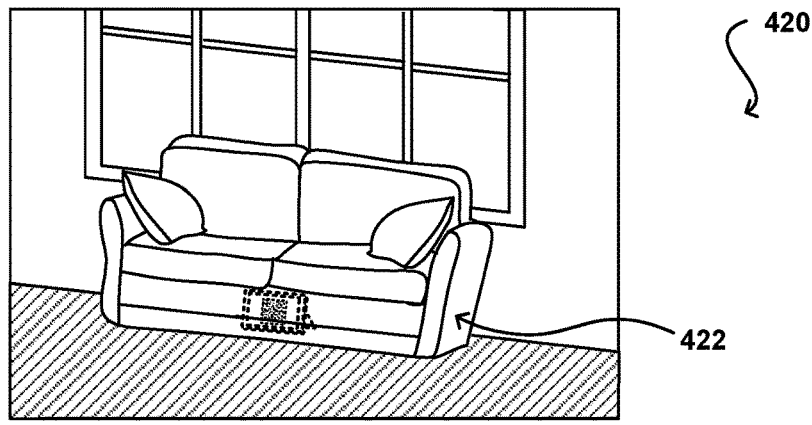
Figure 4C:
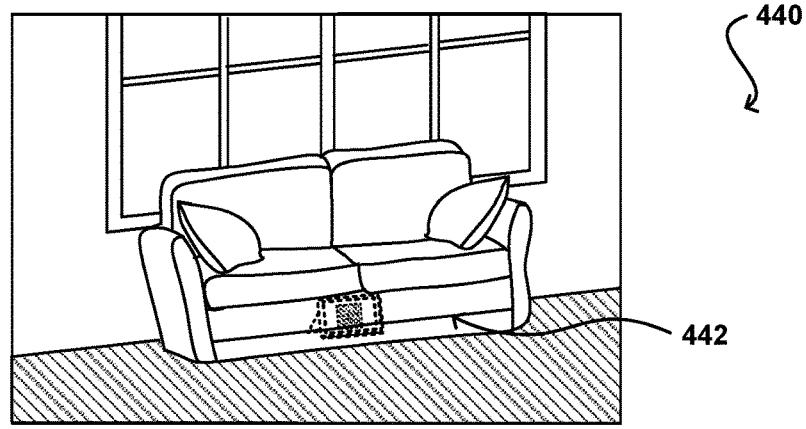

FIGS. 4A, 4B, and 4C illustrate another example of how the viewing of a virtual item in a space can give a sense of how an item would look and/or fit into a particular space or location. In this example, a user has placed a computing device, here referred to as an auxiliary device 404 for differentiation, on the floor in a position where the user might like to place an item such as a couch or chair. In this example a stand is used to position the device at an angle such that the fiducial can more easily be recognized in the captured image data, although the device could be flat on the floor or placed in various other orientations. As mentioned elsewhere herein, large tilt angles can make it difficult to determine the fiducial data, scale, and orientation information, but in at least some embodiments other information can be used to update the pose and distance data once the scale has been determined. This can include, for example, using the device or other objects in the scene as scale markers, or using motion sensors of the device to determine changes in position or orientation, among other such options. The user can then use another computing device to capture a view of the space that includes a fiducial displayed on the auxiliary device. As mentioned, the view of the fiducial can be used to determine the scale and desired location, which can enable an overlay 402 of an item such as a couch to be displayed over the live view (or image for a particular view, etc.). The user can move the computing device to obtain different views 420, 440 as illustrated in FIGS. 4B and 4C, which can help to get a better sense as to how the object would look in the space. New or updated overlays 422, 442 can be displayed for each new or different view, which helps the user determine not only how the couch would look from a front view, but how the couch would fit from various angles, to determine whether it has the proper width, shape, etc.

Figure 5:
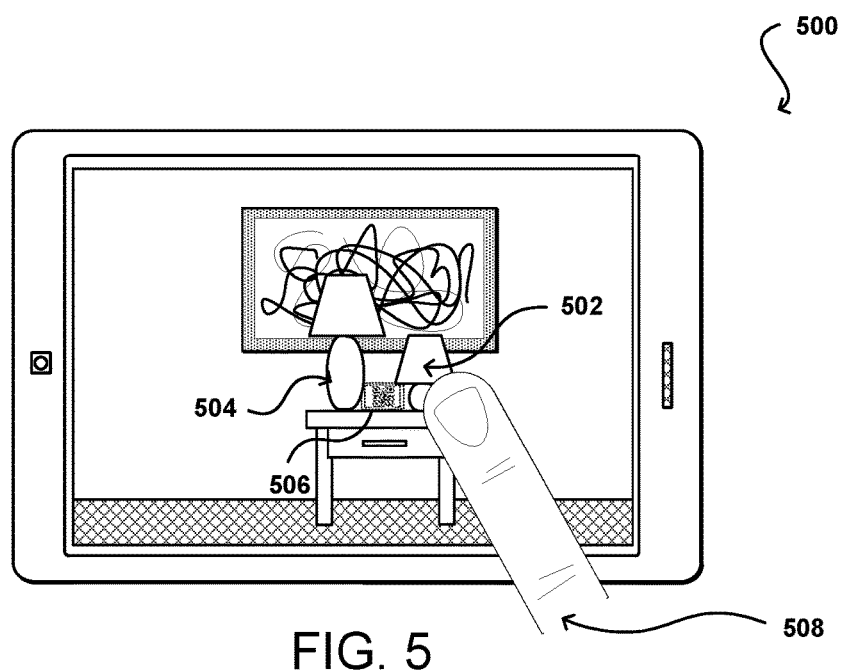
FIG. 5 illustrates a view of multiple object overlays that can be moved around in a live view in accordance with various embodiments.

As illustrated in the example view 500 of FIG. 5, a displayed fiducial 506 that is represented in an image can enable multiple items to be viewed concurrently. These can include items that might complement each other, or alternative items that the user might like to compare in the view of the space. In this example, the user has selected two different lamps 502, 504 that the user is considering for the space. In this example, the user can use a finger 508 along with a touch screen of the computing device to move the overlays in the view, which can enable the user to make a side-by-side comparison of the items in the space. Other approaches for moving graphical items in a view can be used as well as would be apparent to one of ordinary skill in the art in light of the teachings and suggestions contained herein. In some embodiments a set of items or suggestions can be displayed about a periphery of the view and the user can pull those items into, and out of, the view as desired. Each of the items can be rendered as a scale-appropriate overlay as discussed elsewhere herein. In some embodiments a user can select an item that the user owns and compare that to an item of interest using the augmented views. For example, a user can compare items such as shoes, pants, or shirts to determine whether certain dimensions are similar and would likely be desirable to the user.

Figure 6A:
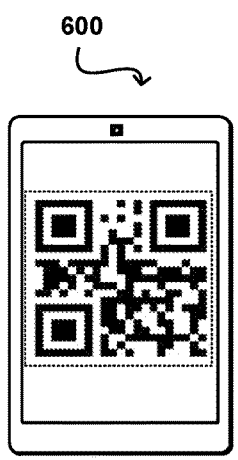
FIGS. 6A, 6B, and 6C illustrate example fiducials that can be utilized in accordance with various embodiments.
Figure 6B:
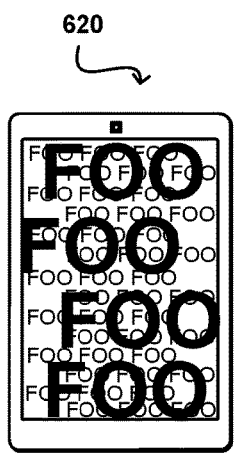
Figure 6C:

There can be any of a number of different types of fiducials utilized in accordance with various embodiments. For example, in the example 600 of FIG. 6A a QR code is displayed that has a recognizable pattern and occupies a significant portion of the display, which can help with detection and analysis. The QR code is also asymmetric, which helps with directionality. As an example, the example 620 of FIG. 6B illustrates a displayed fiducial that occupies the entire screen and provides directionality and ease of detection. The words or image selected can be specific to the device and/or screen characteristics, which can provide information to the imaging device as to the dimensions of the fiducial to be utilized in determining the appropriate scale. The example 640 of FIG. 6C also provides a pattern portion that can be used for recognition and dimensionality, and includes information about the device on which the fiducial is displayed. In this example the information is displayed in plain text, but it should be understood that such information can be encoded or otherwise modified before display, such as to make the display less distracting and/or more visually appealing. In some embodiments the information can be encoded in a watermark such that the information can be conveyed while being relatively imperceptible to a human viewer. As illustrated, the information included can include any appropriate information useful for determining size of the fiducial displayed, as may include manufacturer name, device type, model number, screen size, screen resolution, pixel size, and other such information.

An application executing on a device can obtain information about that device, such as model number or device type. This information can be used to determine or look up the specifics of the particular device. As mentioned, the specifics can be used to render a fiducial that is specific to that device or type of device. The specifics can also be used to select a fiducial from a set of fiducials, where the selected fiducial can be most appropriate for the specifics of the device. In some embodiments the fiducial can be displayed continually, while in other embodiments the fiducial can be shown periodically, such as once every thirty image frames, in order to allow for detection but also allow the display to convey other information that might be of more interest to the user. In at least some embodiments sufficient information is encoded into the fiducial to enable the augmented reality experience to be provided without need to establish communications between the viewing device and the auxiliary device.

Figure 7:
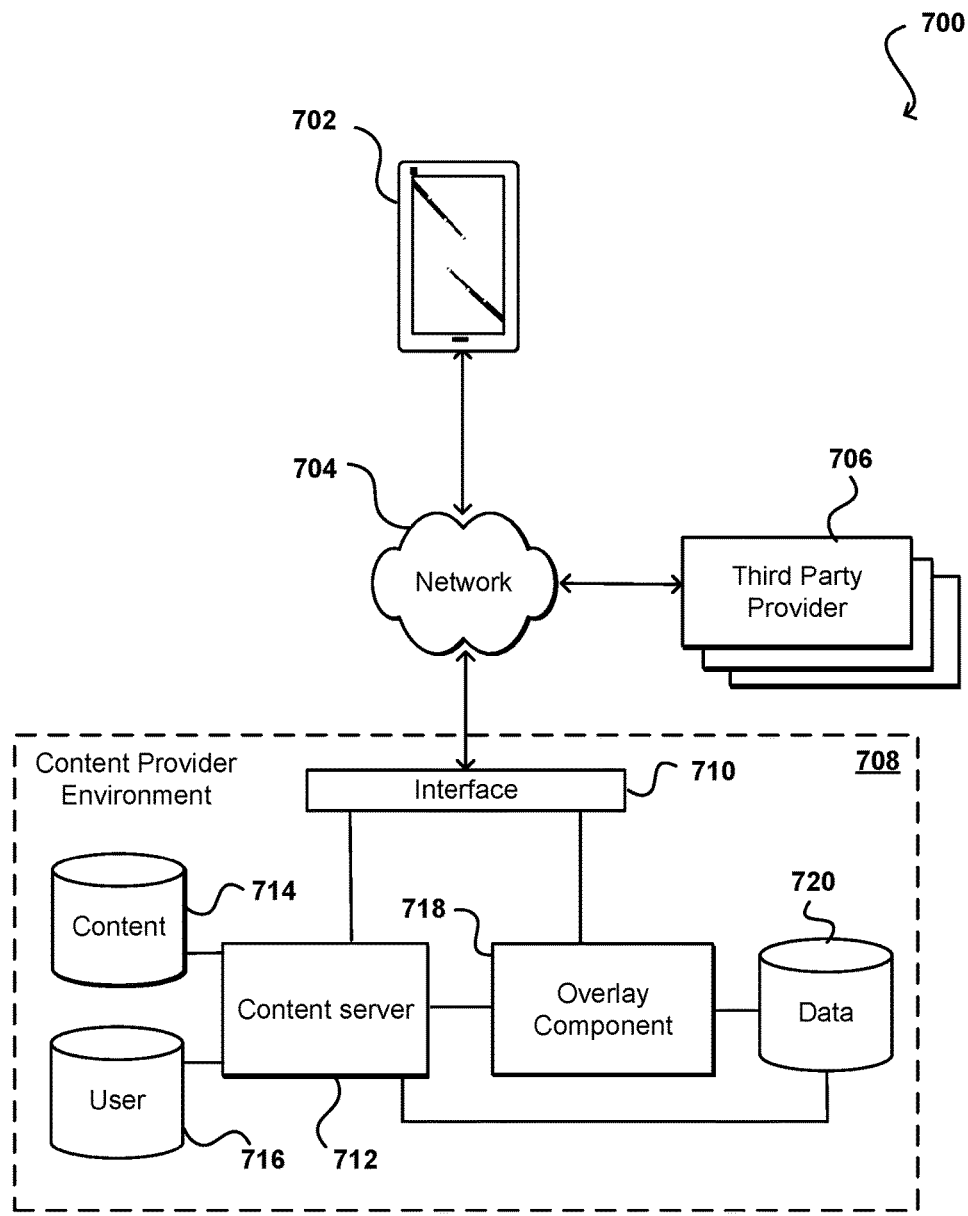
FIG. 7 illustrates an example environment that can be used to implement aspects of the various embodiments.

As mentioned, image data including a representation of the fiducial can be captured by one or more devices, which in at least some embodiments can be transferred to a remote system or service that can perform at least a portion of the image processing, scale determination, or other such tasks. FIG. 7 illustrates an example of such an environment 700 that can be used to implement aspects in accordance with various embodiments. In FIG. 7, a client computing device 702 can submit a request across at least one network 704 to be received by a resource provider environment 708. This can include, for example, a call from a customer wanting to receive scale-appropriate overlay image data to be displayed over a live view on the computing device.

In this example, a call received to the resource provider environment 708 can be received by an interface layer 710 of the environment. As known for network environments, the interface layer can include components such as interfaces (e.g., APIs), load balancers, request and/or data routers, and the like. If the request is a request for content, such as for content including a view of one or more items to be displayed in an application, information for the request can be directed to one or more content servers 712, which can obtain the content from a content data store 714 or other such repository to be sent back across the network(s) to the computing device 702. In some embodiments, information for the request might also be compared against user data in a user data store 716 or other such location do determine, for example, whether the user has access rights to that content. In one example, the content can include a various item content to be displayed as part of a set of search results or set of potential items of interest to be viewed within the scene of the live view, although various other types of content and uses for images can be utilized as well within the scope of the various embodiments.

In some cases, a request received to the content provider environment 708 might be from another entity, such as a third party content provider 706. As discussed elsewhere herein, such providers may provide images and/or virtual models of items to be presented to users as part of, or along with, the served content. The interface layer can determine the type of request and cause information to be forwarded to an overlay component 718 or other such system or service, which in some embodiments can cause the images to be stored to an image or model data store 720 or other appropriate location. In some embodiments, the dimensions and images for an item can be received to the provider environment, and the overlay component can analyze the data to generate a model or representation of the item that is in a format capable of being displayed on the computing device. When a request is received from the content server for a view of an item, the overlay component in some embodiments can determine the appropriate scale and generate a scale-appropriate view of the designated item(s). Any information associated with the images or models, such as a description or identification of one or more features of the items represented, can also be provided and stored in the data store 720. In at least some embodiments, information about features, dimensions, or other aspects of the items can be determined through components of the content provider environment, or otherwise determined. Further, in at least some embodiments the images or object models that are approved to be served as content to a user can be transferred to the content data base 714 or another appropriate location.

Figure 8A:
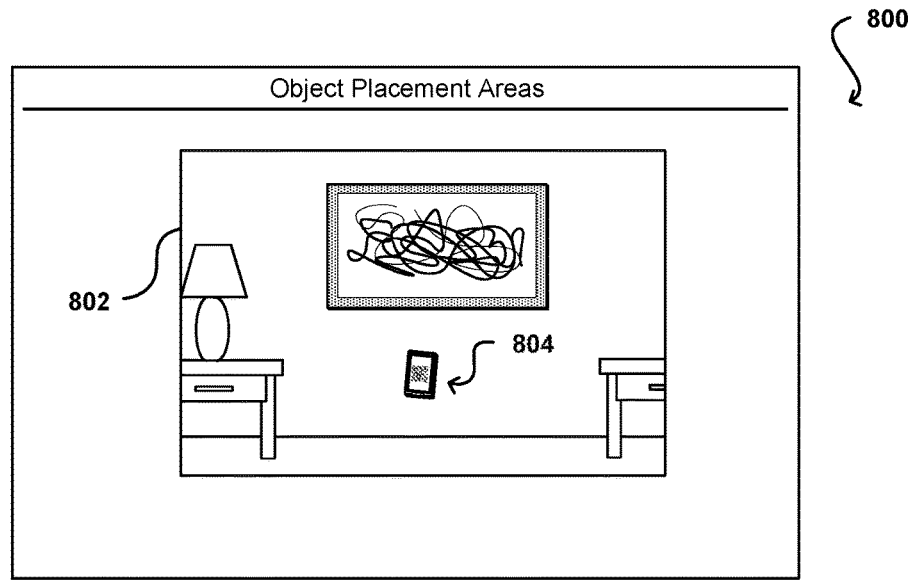
FIGS. 8A and 8B illustrate example approaches to designating locations for placing objects of interest that can be utilized in accordance with various embodiments.
Figure 8B:
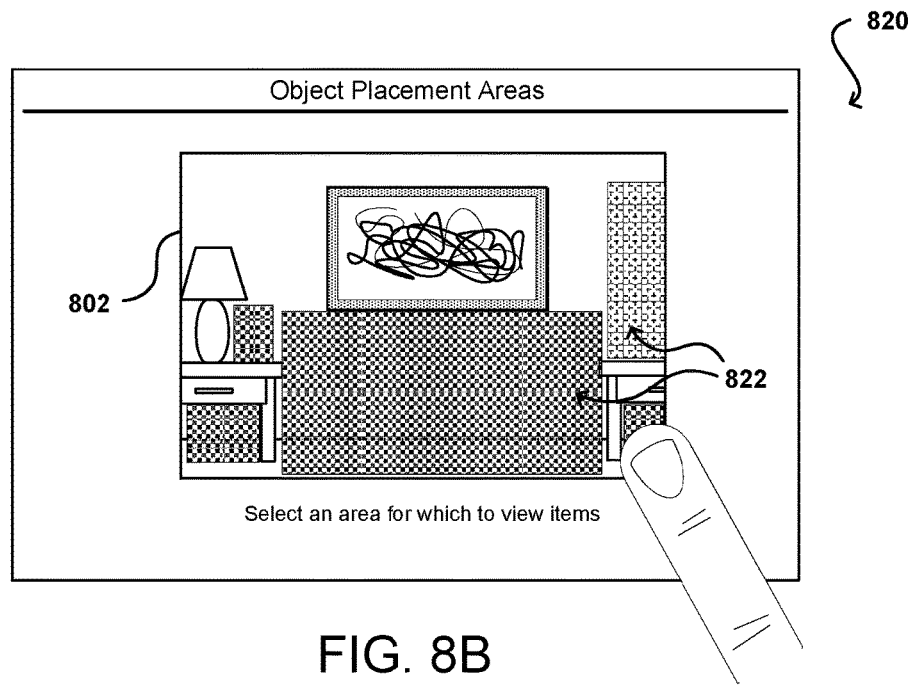

The example 800 of FIG. 8A illustrates a device 804 displaying a fiducial of a known size, placed against a wall of the portion of the room that is to be included in the view 802. In addition to data useful for determining the size of the fiducial, other information can be included as well, such as an associated user, a location, a type of object to be placed at that location, and the like. In some embodiments the fiducial can be placed anywhere in the view in order to obtain scale data, while in other embodiments the fiducial can be placed at a specific location where the user wants to obtain views of objects of interest, such as a space where a user wants to place a television, couch, painting, or end table. When the user causes an item to be selected, a view can be generated that shows the representation of the item of interest placed at the position of the fiducial in the scene. In some embodiments as mentioned elsewhere herein, an object recognition algorithm can be used to process the image data in attempt to identify objects with dimensions stored to an electronic catalog or other such repository, whereby the dimensions, distances, and scale of various items and portions of the scene can be determined. The ability to determine differences in expected representation size for various items can help to determine a distance or depth to each of those objects, even in a two-dimensional image. As mentioned, the ability to obtain stereoscopic data or other depth-inclusive data can help to determine the scale, dimensions, and distances to various objects represented in the view, such as may be used to generate a three-dimensional model of the space, among other such uses. FIG. 8B illustrates an example situation 820 wherein approximate space and dimension data can be used to determine potential places or regions 822 where items could be placed, whereby a user can select one of those regions to obtain views of items that would fit in that space and are scale-appropriate. In some embodiments a user can also cause an overlay to cycle through the potential locations, with the scale of the overlay being adjusted as appropriate for each location.

As mentioned, a fiducial can be displayed through an application executing on a computing device. In some embodiments the application can attempt to detect a "stationary" state of the device, such as when the device is stationary for a period of time (e.g. 3 seconds) and the image data captured from a rear camera consists of only edgeless, dark empty frames that correspond to the device being positioned against a wall or on a table, for example. If the application is in such a state, a fiducial can be automatically displayed that encodes the specifications of the device, in order to determine the scale, and potentially instructions on how to proceed, additional features to help tracking, or other such information. The instructions can prompt the user to scan the fiducial displayed on the first device, or auxiliary device, with another device that can be executing the same application. The application on the second device can recognize the fiducial from the image data by analyzing the image data on the device or a remote server, among other such options. The physical scale of a device can be communicated by embedding the scale through a watermark, QR code, data matrix, or logo, or through the uniqueness of the fiducial image itself, whereby a backend service can map unique images to physical sizes. Devices that are unable to establish their own scale can go through a calibration step in some embodiments, in which images of the marker combined with device IMU data can be used to slowly establish the scale of the device. Once established through such a process, fiducials subsequently displayed on that device can contain the scale information. In addition to scale information as discussed herein, the information in the fiducial can provide other data or instructions to the primary device as well. For example, an auxiliary device can include instructions regarding the use of a particular image as a fiducial. This can provide workflow or discoverability functionality that is initiated by the auxiliary device and picked up by the primary device through the captured image data.

As mentioned, the scale determined from the fiducial can be used to render augmented reality via a display screen of a computing device. This can be used for various applications, such as visualizing and/or comparing different items in the same location or scene. Once the fiducial is placed, the user is allowed to place multiple objects in the scene for relative comparison of size, volume, color etc. The scale can also be used for the interactive staging of items. Visualizing products in-place can provide a desirable experience for various users. Once a user places his or her device with the fiducial mode on, the user can fine-tune the position of the object on the scene with a fingertip or other mechanism for a more precise localization. For some use cases where true scale is not required, users can potentially adjust the rendered size of the object. The user can also be able to restore the visualization to the original size of the object with the help of a "re-scale" button or similar option rendered on the screen or otherwise provided. The fiducial can also be used to place a virtual assistant or other graphical object or element in the scene as part of an augmented reality offering. In one embodiment, an animated character, virtual assistant, or other 3D graphical interface will pop-up by default whenever a device with the fiducial mode is visible on the screen. Having a 3D rendered animated virtual assistant can help increase user engagement, particularly for those who are not familiar with the concept and/or augmented reality. Users can browse or select from among a bunch of popular, advertised, or sponsored items through this interface. A virtual assistant can also interact with the user by the application recognizing the user's voice and emotions using data acquired through the camera and/or microphone of the device. The combined functionality can provide a feeling of a virtual object or character coming out of a device such as a tablet, phone, PC or a TV screen, among other such devices. In some embodiments the virtual assistant can be a shopping assistant who can present deals, recommendations, shopping options, and other such information. In the case of clothing or jewelry, the virtual assistant can virtually model the items for the user. As mentioned, the capturing of image and audio data can enable the virtual assistant to appear to interact with the user, such that if the user is detected to frown or smile the assistant can made appropriate recommendations or adjustments. The virtual assistant can also provide entertainment, such as by telling jokes or dancing, and can also function as advertisements in some situations, such as where the virtual character is rendered as a movie or cartoon character.

Figure 9:
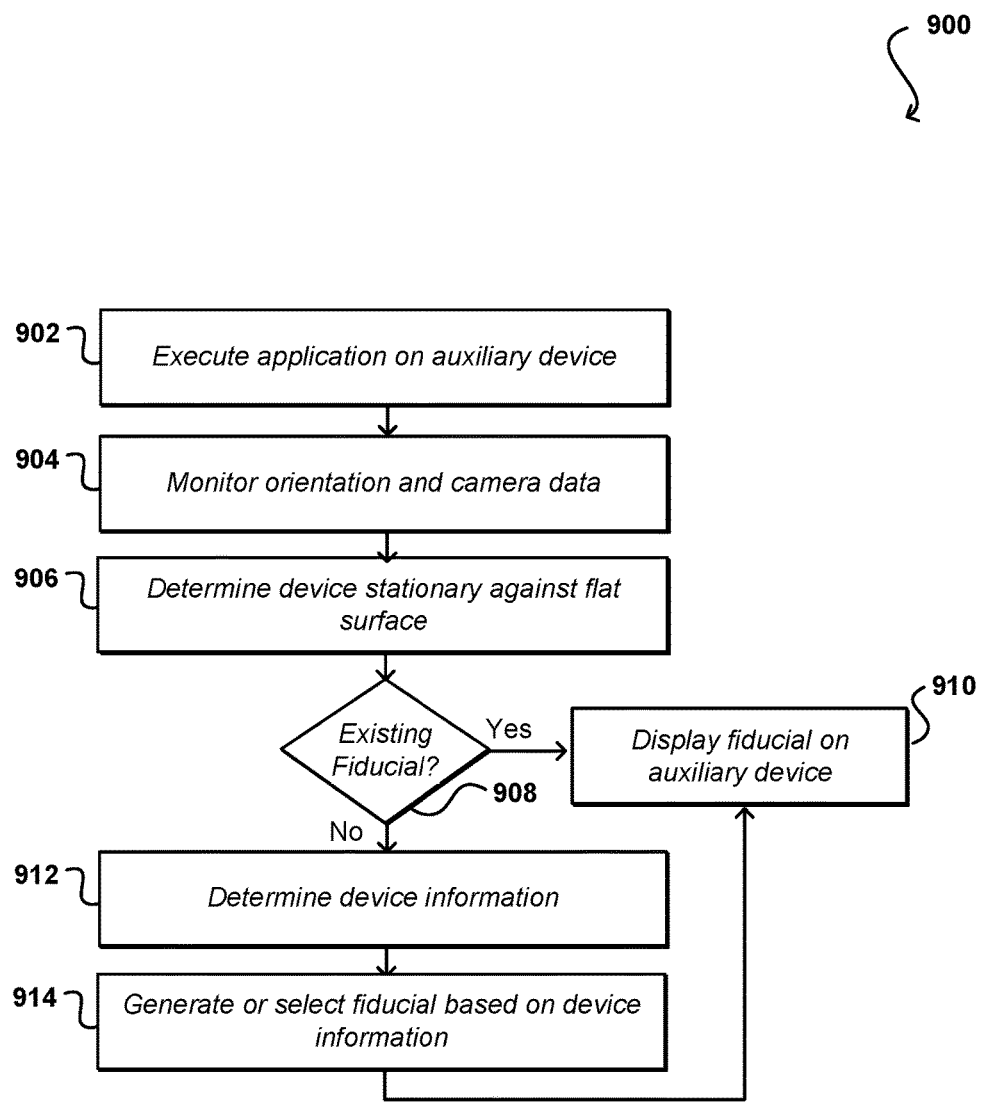
FIG. 9 illustrates an example process for generating a device-appropriate fiducial that can be utilized in accordance with various embodiments that can be utilized in accordance with various embodiments.

FIG. 9 illustrates an example process 900 for displaying a device-appropriate fiducial that can be utilized in such an environment in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an application is executed 902 on an auxiliary device. The application in this example can monitor 904 orientation and camera data for the device in order to attempt to determine 906 when the device is stationary for a minimum period of time, such as at least two or three seconds. When stationary, the image data captured by at least one camera can be analyzed to determine whether the image data substantially corresponds to dark featureless frames that are indicative of the device being positioned against a flat surface, such as a tabletop, wall, or floor. In some embodiments image data captured by at least one camera facing a different direction can be analyzed to detect features that indicate that the device is not merely in a dark room or location, and that the first image data is in fact due to the device being against a substantially planar surface. Such information can cause the application to automatically operate in a stationary mode in some embodiments. Various other approaches can be used as well as discussed or suggested herein.

While the application is operating in a stationary mode, a determination can be made 908 as to whether an existing fiducial has been generated, selected, or located on the auxiliary device. If so, that fiducial can be displayed 910 on the auxiliary device. If such a fiducial is not available, the application can attempt to determine 912 information about the device. This can include, for example, manufacturer, device type, model, screen characteristics, and the like. Based at least in part upon this information, a fiducial can be generated 914 (or selected from a set of existing fiducials) that is appropriate for the auxiliary device. This can include, for example, encoding at least some of the device information in the fiducial in order to enable a viewing device to determine the device information and thus be able to determine the scale of the fiducial. Once obtained or determined, the fiducial can be displayed on the auxiliary device.

Figure 10:
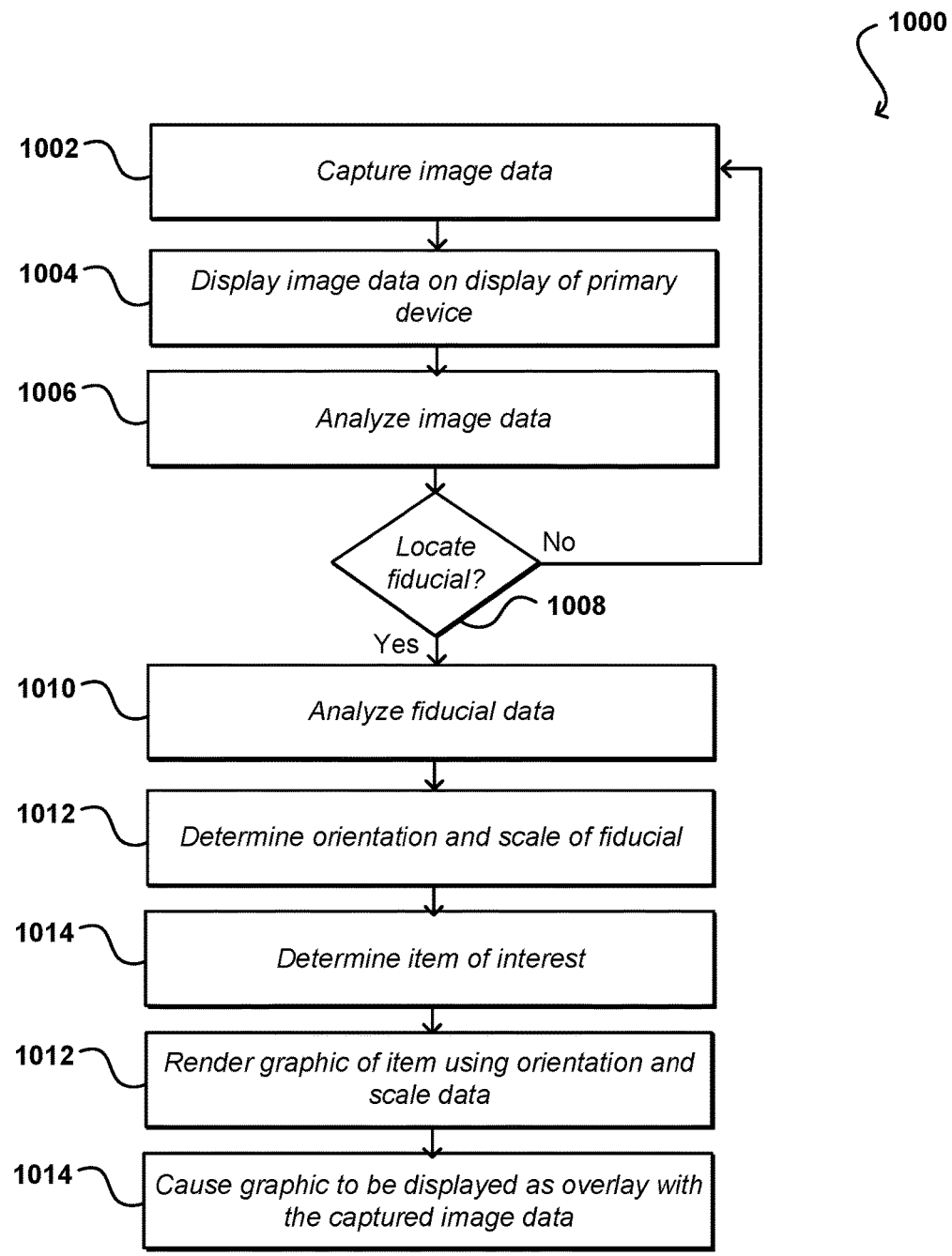
FIG. 10 illustrates an example process for generating an augmented reality display using a digital fiducial that can be utilized in accordance with various embodiments.

FIG. 10 illustrates an example process 1000 for detecting such a fiducial and generating an augmented display based thereon. In this example, image data is captured 1002 using a camera of a computing device, here referred to as a primary device. The image data can include a single image set of images video stream, or other such image data. In this example, at least a portion of the image data will be displayed 1004 on a display screen of the primary device. As mentioned, for video data that is captured and displayed on the display screen, this can represent a "live view" of the image data captured by the device, such that the display will represent, with a slight delay discussed herein, object currently contained within a field of view of the camera capturing the data. At least some of the image data can be analyzed 1006, either on the device or by a remote system or service to which the data is sent. For example, image data can be analyzed periodically, such as for every tenth frame or one frame per second, or can be analyzed each type movement is detected of the device or an object in the image data, among other such options.

During, or as a result of, the analysis, at least one fiducial can be located 1008. This can include, for example, performing pattern analysis on the image in order to attempt to recognize one of a set of potential fiducial patterns represented in the image data. Various other approaches such as watermark detection and optical character recognition can be used as well in at least some embodiments. If no fiducial is detected, the process can continue as described. If a fiducial is located, the fiducial data can be extracted and analyzed 1010, on the device or remotely. As mentioned, the fiducial data can include information about the auxiliary device that can help to determine the actual size of the fiducial as displayed by the auxiliary device. The relative size of the representation of the fiducial in the captured image data then gives the appropriate scale at that location in the scene. Based at least in part upon the fiducial data, the orientation and scale of the fiducial can be determined 1012. In at least some embodiments the pattern recognition algorithm should be robust to rotation, tilt, and skew, and able to determine information about the rotation, tilt, and/or skew for use in determining the relative orientation.

At some point during the process, an item of interest is determined 1014, such as may be the result of a recommendation algorithm, user selection, search result, or other such approach as discussed and suggested elsewhere herein. Information for the item can be located, such as from an electronic product catalog or data repository, and a graphic of that item can be rendered that corresponds to the orientation and scale determined from the fiducial. As mentioned, this can include rendering a two-dimensional view of a three-dimensional model for the item or selecting a view most appropriate for the orientation and then resizing the image based on the scale, among other such options. The graphic can then be caused 1014 to be displayed as an overlay with the captured image data, such as may be displayed "over" a live view of the scene, with the overlay being displayed at an approximate location of the fiducial as represented in the live view. As mentioned, the overlay can then be moved, updated, or otherwise adjusted as appropriate.

Figure 11:
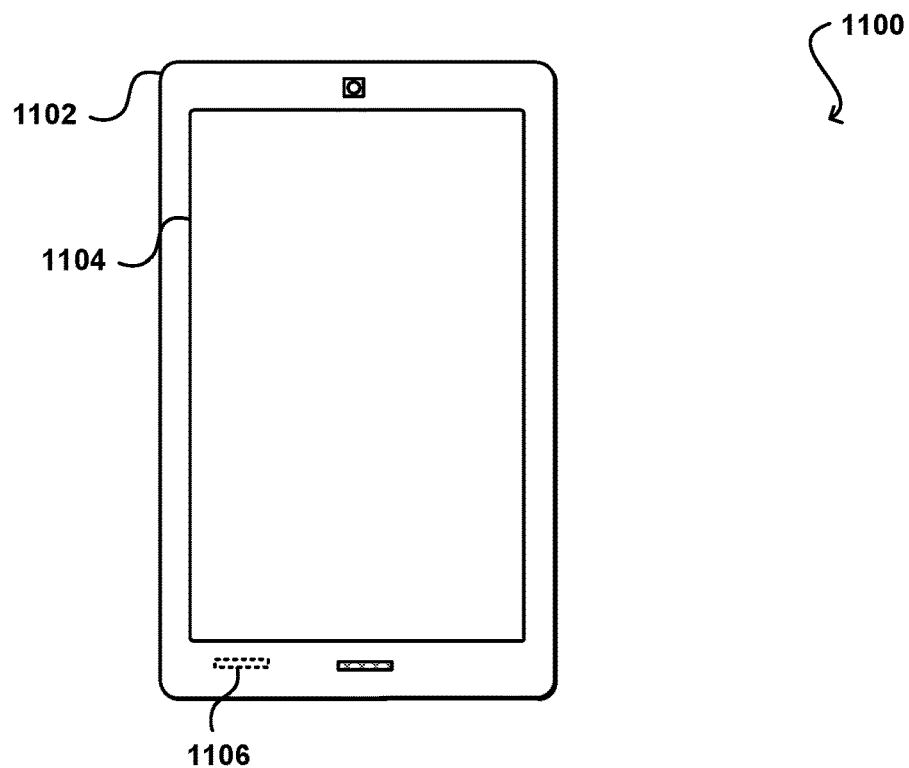
FIG. 11 illustrates an example computing device that can be utilized in accordance with various embodiments.

FIG. 11 illustrates an example computing device 1100 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 12:
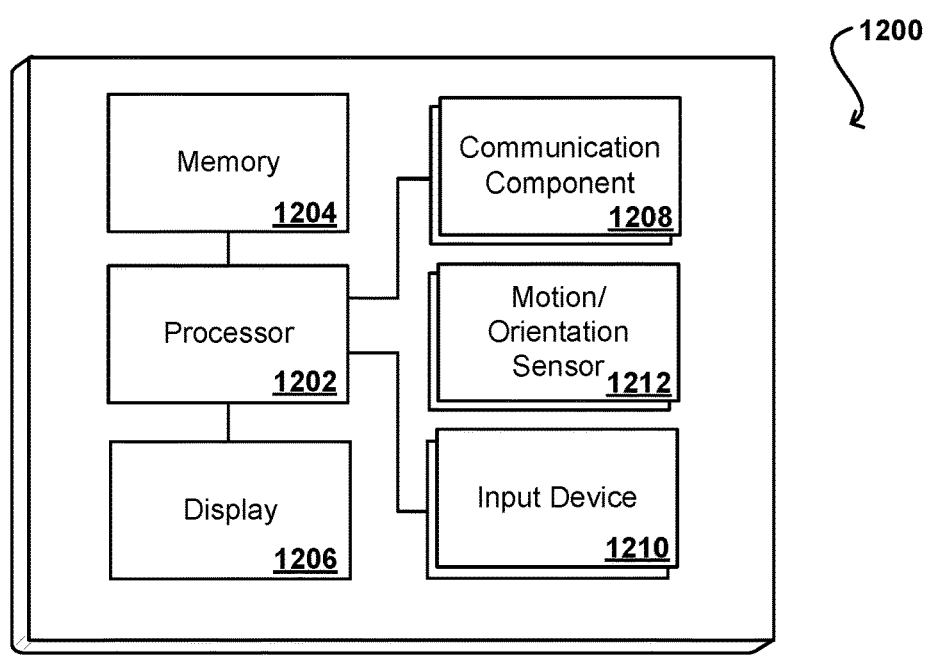
FIG. 12 illustrates an example configuration of components of a computing device, such as the device illustrated in FIG. 11.

In this example, the computing device 1100 has a display screen 1104 and an outer casing 1102. The display screen under normal operation will display information to a user (or viewer) facing the display screen (e.g., on the same side of the computing device as the display screen). As discussed herein, the device can include one or more communication components 1106, such as may include a cellular communications subsystem, Wi-Fi communications subsystem, BLUETOOTH® communication subsystem, and the like. FIG. 12 illustrates a set of basic components of a computing device 1200 such as the device 1100 described with respect to FIG. 11. In this example, the device includes at least one processor 1202 for executing instructions that can be stored in a memory device or element 1204. As would be apparent to one of ordinary skill in the art, the device can include many types of memory, data storage or computer-readable media, such as a first data storage for program instructions for execution by the at least one processor 1202, the same or separate storage can be used for images or data, a removable memory can be available for sharing information with other devices, and any number of communication approaches can be available for sharing with other devices. The device typically will include at least one type of display element 1206, such as a touch screen, electronic ink (e-ink), organic light emitting diode (OLED) or liquid crystal display (LCD), although devices such as portable media players might convey information via other means, such as through audio speakers. The device can include at least one communication component 1208, as may enabled wired and/or wireless communication of voice and/or data signals, for example, over a network such as the Internet, a cellular network, a Wi-Fi network, BLUETOOTH®, and the like. The device can include at least one additional input device 1210 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. The example device can also include at least one orientation and/or motion sensor 1212, such as an inertial sensor, accelerometer, electronic compass, gyroscope, and the like, which can be used to determine the orientation and/or movement of the device.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   determining that an auxiliary computing device, executing a specified application, is stationary against a flat surface for at least a minimum period of time based on a first image data captured by the auxiliary computing device, the auxiliary computing device determined stationary when the first image data include dark frames for at least the minimum period of time;
   causing the auxiliary computing device to display a fiducial on a display screen, the fiducial including fiducial data relating to the auxiliary computing device;
   capturing a second image data using a camera of a primary computing device, the second image data including a representation of a fiducial;
   analyzing the second image data to locate the fiducial and extract the fiducial data;
   determining, based at least in part upon the second image data, a relative orientation of the fiducial with respect to the primary computing device;
   determining, based at least in part upon the fiducial data and a size of the representation in the second image data, a scale of the representation of the fiducial as displayed;
   determining an item to be displayed with the second image data;
   obtaining an overlay element for the item, the overlay element matching the relative orientation and the scale of the representation of the fiducial; and
   displaying the overlay element with the second image data on the primary computing device.

2. The method of claim 1, further comprising:
   capturing additional image data using the camera of the primary computing device;
   analyzing the additional image data to determine a current orientation and a current scale of the fiducial with respect to the primary computing device;
   obtaining a second overlay element for the item, the second overlay element matching the current orientation and the current scale; and
   displaying the second overlay element with the additional image data on the primary computing device.

3. The method of claim 1, wherein obtaining an overlay element for the item further comprises:
   obtaining a set of model data for the item;
   determining a point of view based at least in part upon the relative orientation; and rendering, based at least in part upon the set of model data, the overlay element from the point of view with the scale determined from the representation of the fiducial.

4. The method of claim 1, wherein obtaining an overlay element for the item further comprises:
  determining a set of images for the item, each of the set of images corresponding to a different point of view of the item;
  selecting one of the set of images based at least in part upon the relative orientation; and
  resizing the selected one image to match the scale determined from the representation of the fiducial.

5. A computer-implemented method, comprising:
  capturing a first image data using a camera of a computing device;
  analyzing the first image data to locate a representation of a fiducial in the first image data, the fiducial displayed on a display of an auxiliary device when the auxiliary device is determined stationary against a surface for a minimum period of time based on a second image data captured by the auxiliary device, the auxiliary device being determined stationary when the second image data include dark frames for at least the minimum period of time;
  extracting fiducial data from the representation of the fiducial, the fiducial data providing identifying information for the auxiliary device;
  determining, from fiducial data, a scale of the representation of the fiducial in the first image data; and
  displaying a graphical element for an item, along with at least a portion of the first image data, on a display screen of the computing device, the graphical element sized to correspond to the scale of the representation of the fiducial.

6. The computer-implemented method of claim 5, further comprising:
  displaying the graphical element as an overlay over a portion of the first image data corresponding to a location of the representation of the fiducial in the first image data.

7. The computer-implemented method of claim 5, further comprising:
  receiving selection of the item; and
  locating at least one of a set of images or model data for the item from an electronic catalog.

8. The computer-implemented method of claim 7, further comprising:
  determining a relative orientation of the fiducial based at least in part upon the representation of the fiducial in the first image data; and
  rendering, using the model data, the graphical element from a point of view corresponding to the relative orientation.

9. The computer-implemented method of claim 7, further comprising:
  determining a relative orientation of the fiducial based at least in part upon the representation of the fiducial in the first image data; and
  selecting the at least one of the set of images based at least in part upon the relative orientation.

10. The computer-implemented method of claim 5, wherein the fiducial includes at least one of a specified pattern, a QR code, a bar code, a watermark, a data matrix, a logo, a periodic display, a text block, or a trackable image including a plurality of trackable features.

11. The computer-implemented method of claim 5, further comprising:
  capturing additional image data using the camera of the computing device;
  determining, based on analyzing the additional image data, a change in relative orientation of the fiducial with respect to the computing device; and
  updating the graphical element for the item to contain a view corresponding to a current relative orientation as a result of the change.

12. The computer-implemented method of claim 5, wherein the item is at least one of a product, an animated character, or a virtual assistant.

13. The computer-implemented method of claim 5, further comprising:
  enabling multiple graphical elements for multiple items to be displayed on the display screen of the primary device with views corresponding to the relative orientation and the scale of the representation of the fiducial.

14. The computer-implemented method of claim 5, further comprising:
  receiving navigation input corresponding to the graphical element; and
  causing a display location for the graphical element to change according to the navigation input.

15. The computer-implemented method of claim 5, further comprising:
  causing the first image data to be analyzed by a remote service in communication with the computing device.

16. A computing device, comprising:
  at least one processor;
  a display screen; and
  memory storing instructions that, when executed by the at least one processor, cause the computing device to:
    execute a specified application on the computing device;
    determine, by the specified application, that the computing device is stationary against a surface for at least a minimum period of time based on image data captured by the computing device, the computing device being determined stationary when the image data include dark frames for at least the minimum period of time;
    generate a fiducial element based at least in part upon identifying information for the computing device; and
    display the fiducial element on the display screen, wherein a second device analyzing the fiducial element is enabled to determine a scale of the fiducial element based at least in part upon the identifying information for the computing device.

17. The computing device of claim 16, wherein the instructions when executed further cause the computing device to:
  select the fiducial element from a set of fiducial elements based at least in part on the identifying information for the computing device, the selected fiducial element corresponding to a possible range of sizes of the fiducial element when displayed on the display screen.

18. The computing device of claim 16, wherein the instructions when executed further cause the computing device to:
  encode at least a portion of the information for the computing device in the fiducial element.

19. The computing device of claim 16, wherein the information for the computing device includes at least one of a manufacturer name, a device type, a model number, a screen size, a screen resolution, a pixel size, or a user account.

* * * * *